US011001758B2

(12) United States Patent
Hannington et al.

(10) Patent No.: US 11,001,758 B2
(45) Date of Patent: May 11, 2021

(54) NON-LINEAR SIDE CHAIN LIQUID CRYSTAL POLYORGANOSILOXANES AND METHODS FOR THEIR PREPARATION AND USE IN ELECTRO-OPTIC APPLICATIONS AND DEVICES

(71) Applicant: Dow Silicones Corporation, Midland, MI (US)

(72) Inventors: Jonathan Hannington, Midland, MI (US); Nanguo Liu, Midland, MI (US); Bianxiao Zhong, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 49 days.

(21) Appl. No.: 16/088,283

(22) PCT Filed: May 16, 2017

(86) PCT No.: PCT/US2017/032832
§ 371 (c)(1),
(2) Date: Sep. 25, 2018

(87) PCT Pub. No.: WO2017/213809
PCT Pub. Date: Dec. 14, 2017

(65) Prior Publication Data
US 2019/0144752 A1    May 16, 2019

Related U.S. Application Data

(60) Provisional application No. 62/348,212, filed on Jun. 10, 2016.

(51) Int. Cl.
C09K 19/40    (2006.01)
C08G 77/12    (2006.01)
(Continued)

(52) U.S. Cl.
CPC ............ *C09K 19/408* (2013.01); *C08G 77/06* (2013.01); *C08G 77/12* (2013.01); *C08G 77/38* (2013.01);
(Continued)

(58) Field of Classification Search
CPC ........ C08G 77/42; C08G 77/52; C08G 77/70; C08G 77/80; C09K 19/3804; C09K 19/3833; C09K 19/408; C08F 283/12
See application file for complete search history.

(56) References Cited

U.S. PATENT DOCUMENTS

3,159,601 A    12/1964 Ashby
3,220,972 A    11/1965 Lamoreaux
(Continued)

FOREIGN PATENT DOCUMENTS

| EP | 347895 | 12/1989 |
|----|--------|---------|
| EP | 529597 | 3/1993 |
| WO | 2004022670 | 3/2004 |

OTHER PUBLICATIONS

Bahadur, "Dichroic Liquid Crystal Displays", Liquid Crystal Applications and Uses, 1992, pp. 65-208, vol. 3, World Scientific Publishing Co. Pte. Ltd., Singapore.
(Continued)

*Primary Examiner* — Chanceity N Robinson
*Assistant Examiner* — Anna Malloy
(74) *Attorney, Agent, or Firm* — Catherine U. Brown

(57) ABSTRACT

A non-linear side chain liquid crystal polyorganosiloxane differs from previous side chain liquid crystal polyorganosiloxanes. A method for preparing the non-linear side chain liquid crystal polyorganosiloxane involves hydrosilylation reaction of a SiH rich intermediate with an aliphatically unsaturated mesogenic compound. A liquid crystal composition containing the non-linear side chain liquid crystal
(Continued)

polyorganosiloxane is useful in dynamic scattering mode electro-optic device for various applications.

13 Claims, 3 Drawing Sheets

(51) Int. Cl.
| | | |
|---|---|---|
| C08G 77/06 | (2006.01) | |
| C09K 19/44 | (2006.01) | |
| G02F 1/137 | (2006.01) | |
| C09K 19/30 | (2006.01) | |
| C08G 77/38 | (2006.01) | |
| C09D 183/04 | (2006.01) | |
| C09D 183/08 | (2006.01) | |
| C08G 77/388 | (2006.01) | |
| C09K 19/38 | (2006.01) | |
| C08G 77/00 | (2006.01) | |
| C09K 19/12 | (2006.01) | |

(52) U.S. Cl.
CPC ......... *C08G 77/388* (2013.01); *C09D 183/04* (2013.01); *C09D 183/08* (2013.01); *C09K 19/3003* (2013.01); *C09K 19/3804* (2013.01); *C09K 19/3833* (2013.01); *C09K 19/44* (2013.01); *G02F 1/13781* (2013.01); *C08G 77/70* (2013.01); *C08G 2250/00* (2013.01); *C09K 2019/122* (2013.01); *C09K 2019/123* (2013.01); *C09K 2019/3016* (2013.01); *G02F 1/13756* (2021.01)

(56) References Cited

U.S. PATENT DOCUMENTS

| | | | |
|---|---|---|---|
| 3,296,291 A | | 1/1967 | Chalk et al. |
| 3,419,593 A | | 12/1968 | Willing |
| 3,516,946 A | | 6/1970 | Modic |
| 3,814,730 A | | 6/1974 | Karstedt |
| 3,989,668 A | | 11/1976 | Lee et al. |
| 4,358,391 A | | 11/1982 | Finkelmann et al. |
| 4,410,570 A | | 10/1983 | Kreuzer et al. |
| 4,744,028 A | * | 5/1988 | Karmarkar ............ G06Q 10/04 705/7.22 |
| 4,766,176 A | | 8/1988 | Lee et al. |
| 4,774,028 A | | 9/1988 | Imai et al. |
| 4,784,879 A | | 11/1988 | Lee et al. |
| 4,981,607 A | | 1/1991 | Okawa et al. |
| 5,017,654 A | | 5/1991 | Togashi et al. |
| 5,036,117 A | | 7/1991 | Chung et al. |
| 5,175,325 A | | 12/1992 | Brown et al. |
| 5,259,987 A | | 11/1993 | McArdle et al. |
| 5,455,697 A | | 10/1995 | Coles et al. |
| 5,547,604 A | | 8/1996 | Coles et al. |
| 6,060,133 A | | 5/2000 | Lacey et al. |
| 6,277,451 B1 | | 8/2001 | Mehl et al. |
| 7,678,292 B2 | | 3/2010 | Netland et al. |
| 8,168,737 B2 | | 5/2012 | Alvarez et al. |
| 8,956,548 B2 | | 2/2015 | Clapp et al. |
| 8,980,383 B2 | | 3/2015 | Coles et al. |
| 9,175,220 B2 | | 11/2015 | Sun et al. |
| 2013/0342773 A1 | * | 12/2013 | Chu .................... C09K 19/582 349/33 |
| 2016/0090534 A1 | | 3/2016 | Gotoh et al. |
| 2016/0108317 A1 | | 4/2016 | Kirsch et al. |

OTHER PUBLICATIONS

Bamfield, Chromic Phenomena, Technological Applications of Colour Chemistry, 2001, pp. 80-112 and 131, The Royal Society of Chemistry.

Chojnowski, et. al. "Synthesis of Branched Polysiloxanes with Controlled Branching and Functionalization by Anionic Ring-Opening Polymerication", 2003, Macromolecules, 36, pp. 3890-3897, Lodz, Poland.

Bahadur, Chapter 4 Physical Properties of Liquid Crystals, Liquid Crystals Applications and Uses, vol. 1 (ISBN 981-02-0110-9).

Fischler, "Photoinduzierte Addition Von R3SiH AN (n-Butadien) Tricarbonyleisen", Journal of Organometallic Chemistry, 19801, pp. 181-190.

Franck-Neumann, "Reactions De Type Friedel-Crafts De Complexes De Trialkylsilyl-2 Butadienes Fer-Tricarbonyle, Doubles Acylations D'une Meme Unite Dienique Complexee" Journal of Organometallic Chemistry, 1987, pp. 389-404.

Han, et. al., "Construction of Topological Mcromolecular Side Chains Packing Model: Study Unique Relationship and Differences in LC-Microstructures and Properties of Two Analogous Aarchitectures with Well-Designed Side Attachement Density", Macromolecules, Feb. 10, 2015, 48, pp. 925-941, ACS.

Mehl, et. al., "Polyhedral Liquid Crystal Silsesquioxanes", 1999, Appled Organometallic Chemistry, 13, pp. 261-272, Department of Chemistry, University of Hull, Hull, UK.

Mitrokhin, "Flexible Biastable Smetic-A LCD Based on PDLC", SID05 Digest, pp. 1778-1781.

Rybinskaya, "Iron Carbonyl Complexes of Vinylsilanes, Vinyldisilanes and Vinylsiloxanes", Journal of Organometallic Cehmistry, 1981, pp. 373-383.

S.T. Wu "Molecular design strategies for high birefringence liquid crystals" MRS vol. 709, p. 219-228, 2002.

\* cited by examiner

NON-LINEAR SIDE CHAIN LIQUID CRYSTAL POLYORGANOSILOXANES AND METHODS FOR THEIR PREPARATION AND USE IN ELECTRO-OPTIC APPLICATIONS AND DEVICES

CROSS-REFERENCE TO RELATED APPLICATIONS

This application is a U.S. national stage filing under 35 U.S.C. § 371 of PCT Application No. PCT/US2017/032832 filed on 16 May 2017, which claims the benefit of U.S. Provisional Patent Application No. 62/348,212 filed 10 Jun. 2016 under 35 U.S.C. § 119 (e). PCT Application No. PCT/US2017/032832 and U.S. Provisional Patent Application No. 62/348,212 are hereby incorporated by reference.

BACKGROUND

Side Chain Liquid Crystal Polysiloxanes ("SCLCP"), e.g., graft or rake type polymers with liquid crystalline moieties pendant from a linear siloxane polymer backbone, have been prepared in U.S. Pat. No. 4,358,391 to H. Finkelmann et al, "Compositions containing liquid crystalline phases". U.S. Pat. No. 8,956,548 to T. Clapp et al, "Liquid Crystal formulations and structures for smectic A ("SmA") optical devices" utilizes linear SCLCP in compositions for use in electro-optic devices and applications. For example, the SmA compositions including linear SCLCP may be used in devices for privacy glazing applications, automotive sunroofs, greenhouses, smart windows, signage, and displays.

It is desirable that electro-optic ("EO") devices have balanced EO response times for the transitions from the transmitting state to the scattering state, and vice versa, for faster total response and a better transition aesthetic. However, SmA compositions, including those containing linear SCLCP may suffer from imbalanced EO responses because different mechanisms are responsible for switching the devices into the transmitting state and into the scattering state. Generally, Dynamic Scattering Mode SmA devices switch to the transmitting state much faster than to the scattering state, especially when the device gap is small. As a result, drive schemes can become more complex, and such devices (particularly devices with larger areas, such as smart windows) may take longer than desirable to switch into the scattering state. Furthermore, the nucleation density of scattering centers during the transmitting to scattering transition can be low, leading to a transition which can be inhomogeneous and have a poor aesthetic ("blotchy" appearance). To address this issue, various additives had been included in the compositions to create defects in the SmA layers. However, to date none of them proved sufficiently effective.

Therefore, there is an industry need for a method for balancing the EO response times for a liquid crystal composition for a given device gap.

BRIEF SUMMARY OF THE INVENTION

A non-linear side chain liquid crystal polyorganosiloxane ("SCLCP") comprises units of formulae: $(R^1{}_2R^2SiO_{1/2})_a$ $(R^1R^2SiO_{2/2})_b(R^1SiO_{3/2})_c(SiO_{4/2})_d(R^1{}_2SiO_{2/2})_e(R''R^2SiO_{2/2})_f$ where each $R^1$ is independently a hydrogen atom, a monovalent hydrocarbon group, a monovalent halogenated hydrocarbon group, or a divalent hydrocarbon group; each $R^2$ is independently a liquid crystal group; each $R''$ is a covalent bond linking to a divalent hydrocarbon group for $R^1$; subscript a is >0; subscript b is >0; subscript c is 0 to 10; subscript d is 0 to 10; subscript e is ≥0; and subscript f is ≥0, wherein when at least one instance of $R^1$ is a divalent hydrocarbon group, then subscript f is >0, and wherein at least one of subscript c and subscript d is >0. The non-linear SCLCP may be used in a silicone liquid crystal ("SiLC") composition for electro-optic ("EO") applications and devices.

Figure 1:
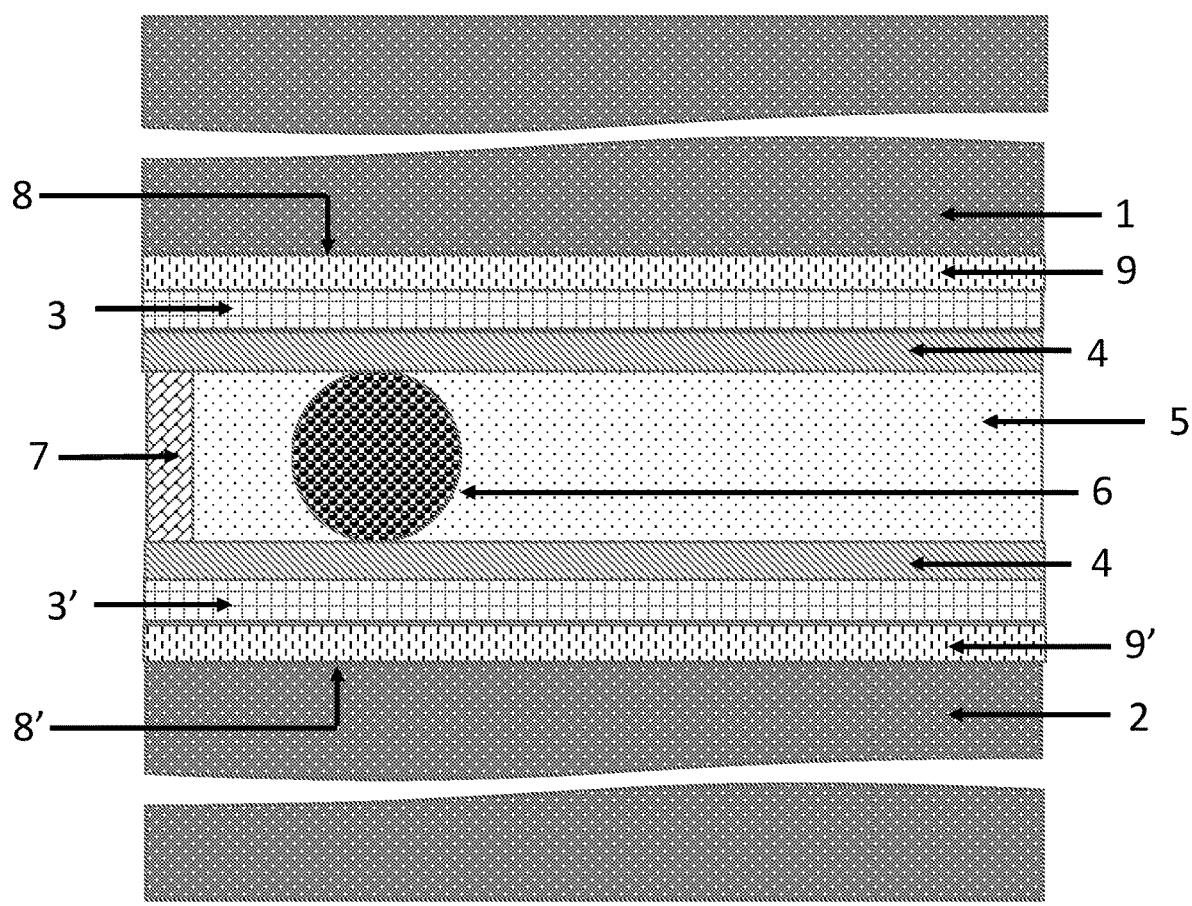
FIG. 1 is a cross section of a device including the non-linear side chain liquid crystal polyorganosiloxane composition described herein.

Top right and bottom left segments=clear state, Top left and bottom right=scattered. No power is being applied to the bistable device. The scattering texture is very fine, note that the circles (for example visible in the clear segment, top right) are spherical spacers beads (10 microns in diameter) which are used to control the thickness of the Dynamic Scattering Mode device.

REFERENCE NUMERALS

1—First substrate
2—Second substrate
3—First electrode
3'—Second electrode
4—Interfacial layer
5—Liquid crystal
6—Spacer
7—Edge seal
8—First surface
8'—Second surface
9—Barrier layer
9'—Second Barrier Layer

DETAILED DESCRIPTION OF THE INVENTION

Non-Linear Side Chain Liquid Crystal Polyorganosiloxane

The non-linear side chain liquid crystal polyorganosiloxane comprises units of formulae: $(R^1{}_2R^2SiO_{1/2})_a$ $(R^1R^2SiO_{2/2})_b(R^1SiO_{3/2})_c(SiO_{4/2})_d(R^1{}_2SiO_{2/2})_e(R''R^2SiO_{2/2})_f$ where each $R^1$ is independently a hydrogen atom, a monovalent hydrocarbon group, a monovalent halogenated hydrocarbon group, or a divalent hydrocarbon group; each $R^2$ is independently a liquid crystal group; each $R''$ is a covalent bond linking to a divalent hydrocarbon group for $R^1$; subscript a is >0; subscript b is >0; subscript c is 0 to 10; subscript d is 0 to 10; subscript e is ≥0; and subscript f is ≥0. When subscript c is 0, then subscript d is >0. When subscript d is 0, then subscript c is >0. When at least one instance of $R^1$ is a divalent hydrocarbon group, then subscript f is >0.

Each $R^1$ is independently a hydrogen atom, a monovalent hydrocarbon group (as defined herein below), a monovalent halogenated hydrocarbon group (as defined herein below), or a divalent hydrocarbon group. When $R^1$ is divalent, subscript f>0 and the divalent hydrocarbon group connects silicon atoms in two different units of the non-linear SCLCP. Suitable monovalent hydrocarbon groups for $R^1$ are exemplified by alkyl, cycloalkyl, alkenyl, alkynyl, aryl, and aralkyl as defined herein below. Alternatively, the monovalent hydrocarbon group for $R^1$ may be an alkyl group of 1 to 10 carbon atoms, alternatively 1 to 6 carbon atoms, and alternatively 1 to 4 carbon atoms. Alternatively, the monovalent hydrocarbon group for $R^1$ may be an aryl group of 5 to 18 carbon atoms. Alternatively, the monovalent hydrocarbon group for $R^1$ may be alkyl or aryl. Alternatively, the monovalent halogenated hydrocarbon groups for $R^1$ may be 3,3,3-trifluoropropyl. Alternatively, the monovalent hydrocarbon group for $R^1$ may be methyl or phenyl; alternatively the monovalent hydrocarbon groups for $R^1$ may be methyl.

Suitable divalent hydrocarbon groups for $R^1$ include alkylene groups such as ethylene, propylene (including isopropylene and n-propylene), and butylene (including n-butylene, t-butylene and isobutylene); and pentylene, hexylene, heptylene, octylene, and branched and linear isomers thereof; arylene groups such as phenylene; and alkylaralkylene groups such as:

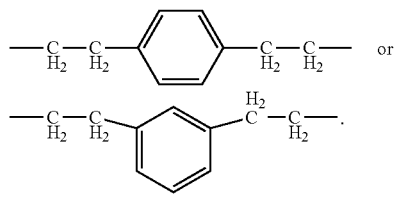

Alternatively, each divalent hydrocarbon group for group $R^1$ may be ethylene, propylene, butylene or hexylene. Alternatively, each divalent hydrocarbon group for $R^1$ may be ethylene or propylene.

Each $R^2$ is independently a liquid crystal group. The liquid crystal group may be a thermotropic liquid crystal group. Exemplary liquid crystal groups include but are not limited to, alkyl functional, alkenyl functional or alkenyloxy functional: (A) polyphenyl functional groups, (B) a benzoate functional groups, or (C) azomethine functional groups. Alternatively, $R^2$ may be an alkenyl functional polyphenyl functional group or an alkenyloxy functional polyphenyl functional groups. Exemplary alkenyl functional polyphenyl groups include vinyl functional cyanobiphenyl and vinyl functional cyanoterphenyl. Exemplary alkenyloxy functional polyphenyl groups include alkenyloxy functional cyano biphenyl such as 4-allyloxy-4'-cyanobiphenyl, 4-cyano-4'4-hexenyloxybiphenyl, and 4-allyloxy-4'-cyanoterphenyl. Exemplary alkenyl functional polyphenyl groups include vinyl functional cyanoterphenyl. Alternatively, $R^2$ may have formula:

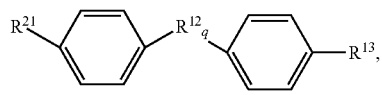

where subscript q is 0 or 1, $R^{12}$ is a group selected from —COO—, —OOC—, —CH$_2$—CH$_2$—, —CH$_2$O—, —CF$_2$O—, OCF$_2$, —C=C—, —C≡C— or phenylene; $R^{13}$ is selected from H, a cyano group, a thiocyanate group, NO$_2$, or a halogen atom such as Cl or F; and $R^{21}$ is a divalent linking group. $R^{21}$ is formed by hydrosilylation of an aliphatically unsaturated group which is used to covalently bond the group $R^2$ to a silicon atom via a hydrosilylation reaction. For example $R^{21}$ can be an alkylene group formed by hydrosilylation of alkenyl group or an alkyleneoxy group formed by hydrosilylation of an alkenyloxy group, such as CH$_2$=CH—(CH$_2$)$_n$—O—, where subscript n is 1 to 20, alternatively n is 1 to 12, and alternatively n is 1 to 8

Alternatively, the liquid crystal group for $R^2$ may have formula:

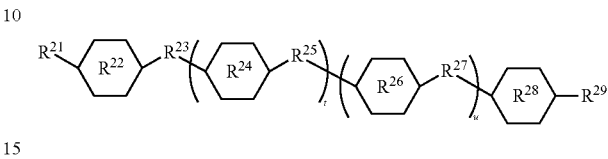

In this formula, ring systems $R^{22}$, $R^{24}$, $R^{26}$, and $R^{28}$ are each divalent, and they may be independently selected from: phenylene, cyclohexylene, pyrimidine-diyl, pyridazinyl-diyl, pyridine-diyl, pyrazin-diyl, 1,4-dioxane-diyl, 1,3-dioxane-diyl, naphthylene-diyl, and bicyclo (2.2.2)octylene; wherein the radicals indicated by -diyl appear on carbon atoms. Divalent linking groups $R^{23}$, $R^{25}$, and $R^{27}$ are each independently selected from the group consisting of a covalent bond and a group of formula —COO—, —OOC—, —CH$_2$—CH$_2$—, —CH$_2$O—, —CF$_2$O—, —OCF$_2$—, —C=C—, —C≡C—, —CH=N—, or —N=N—. Alternatively, at least one of groups $R^{23}$, $R^{25}$, and $R^{27}$ is a covalent bond. Alternatively, when subscript t=0, and subscript u=0, $R^{23}$ may be a covalent bond. Terminal group $R^{29}$ is selected from H, a cyano group, a thiocyanate group, NO$_2$, or a halogen atom such as Cl or F, OR, or R where R is an alkyl group or a group of formula —N(CH$_3$)$_2$. Group $R^{21}$ is formed by hydrosilylation of an aliphatically unsaturated group which is used to covalently bond the group $R^2$ to a silicon atom via a hydrosilylation reaction. For example $R^{21}$ can be an alkylene group formed by hydrosilylation of alkenyl group or an alkyleneoxy group formed by hydrosilylation of an alkenyloxy group, such as CH$_2$=CH —(CH$_2$)$_n$—O—, where subscript n is 1 to 20, alternatively n is 1 to 12, and alternatively n is 1 to 8. Subscript t can be 0 or 1, and subscript u can be 0 or 1. Alternatively, one of subscript t and u is 0 and the other is 1. Alternatively, both subscript t and subscript u may be 0.

Subscript a is >0. Alternatively, subscript a may be 2 to 100; alternatively, subscript a may be 4 to 50; alternatively, subscript a may be from 2 to 10; and alternatively subscript a may be 2 to 4. Subscript b is >0. Alternatively, subscript b may be 1 to 100; alternatively, subscript b may be 2 to 50; alternatively subscript b may be 3 to 10, alternatively subscript b may be 5 to 30, and alternatively subscript b may be 5 to 20.

Subscript c is 0 to 10. Alternatively, subscript c may be 0 to 5, and alternatively subscript c may be 0 to 3. Subscript d is 0 to 10. Alternatively, subscript d may be 0 to 5, and alternatively, subscript d may be 0 to 3.

Subscript e is ≥0. Alternatively, subscript e may be 0 to 30, and alternatively subscript e may be 0 to 10.

Subscript f is ≥0. Subscript f is >0 when at least one instance of $R^1$ is a divalent hydrocarbon group. Alternatively, subscript f may be 0 to 30, and alternatively, subscript f may be 0 to 10.

The non-linear side chain liquid crystal polyorganosiloxane may be a Q branched non-linear side chain liquid crystal polyorganosiloxane, for example, when subscript c=0 and subscript d=1. When subscript d=1, a quantity (a+b+d+e+f+g) may range from 25 to 35. The Q branched non-linear side chain liquid crystal polyorganosiloxane may have formula:

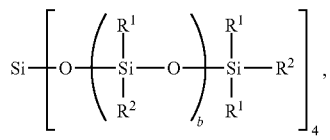

where $R^1$, $R^2$, and subscript b are as defined above. This Q branched non-linear SCLCP may have subscript b with a value such that a total average degree of polymerization (DP) of this Q branched non-linear SCLCP is 10 to 200, alternatively 10 to 100, alternatively 20 to 50, and alternatively 25 to 35. Each instance of subscript b may be the same or different.

Alternatively, the non-linear side chain liquid crystal polyorganosiloxane may be type (I), comprising units of formulae: $(HR^3SiO_{2/2})$ $(R^2R^3SiO_{2/2})$ $(R^3{}_2SiO_{2/2})$ $(DR^3SiO_{2/2})$ $(HR^3{}_2SiO_{1/2})$ $(R^2R^3{}_2SiO_{1/2})$ $(R''R^3SiO_{2/2})$, where R" and $R^2$ are as described above, each D is independently a divalent hydrocarbon group (as described above for the divalent hydrocarbon groups of $R^1$), and each $R^3$ is independently a monovalent hydrocarbon group or a monovalent halogenated hydrocarbon group (as described above for the monovalent hydrocarbon groups and monovalent halogenated hydrocarbon groups of $R^1$). The type (I) non-linear side chain liquid crystal polyorganosiloxane is a polycyclic polyorganohydrogensiloxane having linear and branched polyorganosiloxane segments linking silicon atoms in different rings through divalent hydrocarbon groups and further comprising liquid crystal groups bonded to some of the silicon atoms.

Alternatively, the non-linear side chain liquid crystal polyorganosiloxane may be type (II), comprising units of formulae: $(R''R^3SiO_{2/2})$, $(R^2R^3SiO_{2/2})$, $(HR^3SiO_{2/2})$, $(DR^3{}_2SiO_{1/2})$, $(R^3{}_2SiO_{2/2})$, $(R^3{}_{2-x}R^2{}_xSiO_{1/2})$, and $(R^3{}_{2-x}H_x-SiO_{1/2})$, where each subscript x is independently 0 or 1 and R", $R^2$, $R^3$ and D are as described above. The type (II) non-linear side chain liquid crystal polyorganosiloxane is a polycyclic polyorganohydrogensiloxane having linear and branched polyorganosiloxane segments linking silicon atoms in different rings through divalent hydrocarbon groups, and further comprising liquid crystal groups bonded to some of the silicon atoms.

Alternatively, the non-linear side chain liquid crystal polyorganosiloxane may be type (III) comprising units of formulae:

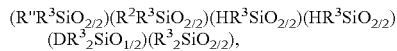

where R", $R^2$, $R^3$ and D are as described above. The type (III) non-linear side chain liquid crystal polyorganosiloxane is a polycyclic polyorganohydrogensiloxane having linear polyorganosiloxane segments linking silicon atoms in different rings through divalent hydrocarbon groups and further comprising liquid crystal groups bonded to some of the silicon atoms.

Without wishing to be bound by theory, non-linear side chain liquid crystal polyorganosiloxanes having certain z average molecular weight ("Mz"), as measured by gel permeation chromatography ("GPC"), may provide benefits to the silicone liquid crystal ("SiLC") composition, described below. For example, for type (I), type (II), and type (III) non-linear side chain liquid crystal polyorganosiloxanes having Mz of ≤120,000 may render the SiLC composition easier to filter than compositions containing non-linear chain liquid crystal polyorganosiloxanes having Mz>120,000. Without wishing to be bound by theory, it is thought that when Mz of the type (I), type (II), and type (III) non-linear side chain liquid crystal polyorganosiloxanes is too low (e.g., Mz<50,000), the SiLC composition may have unbalanced switching times for clearing and scattering, and/or an undesirable switching aesthetic. Alternatively, the type (I), type (II), and/or type (III) non-linear SCLCP may have Mz of 50,000 to 120,000. Alternatively, Mz may be 40,000 for Q branched non-linear side chain liquid crystal polyorganosiloxanes used in SiLC compositions that are easier to filter than SiLC compositions containing Q branched non-linear side chain liquid crystal polyorganosiloxanes having Mz>40,000. Alternatively for Q branched non-linear side chain liquid crystal polyorganosiloxanes, Mz may be 3,000 to 40,000; alternatively 4,000 to 35,000; alternatively 5,000 to 30,000; and alternatively 5,000 to 40,000.

Method for Preparing the Non-Linear Side Chain Liquid Crystal Polyorganosiloxane The non-linear side chain liquid crystal polyorganosiloxane described above may be prepared by a method comprising hydrosilylating ingredients comprising:
(i) an aliphatically unsaturated liquid crystal group forming compound, and
(ii) an SiH rich intermediate.

The aliphatically unsaturated liquid crystal group forming compound used in the method may be any compound known in the art and capable of undergoing a hydrosilylation reaction to form a liquid crystal group (i.e., a compound that will form a group which exhibits liquid crystal properties after grafting via hydrosilylation, regardless of whether the compound exhibits any liquid crystal phase before hydrosilylation) on the non-linear side chain liquid crystal polyorganosiloxane described above. The aliphatically unsaturated liquid crystal compound may be a thermotropic liquid crystal compound. The liquid crystal compound is exemplified by (A) a substituted or unsubstituted polyphenyl compound having an aliphatically unsaturated group, (B) a substituted or unsubstituted benzoate compound having an aliphatically unsaturated group, (C) a substituted or unsubstituted azomethine compound having an aliphatically unsaturated group. Alternatively, the aliphatically unsaturated liquid crystal compound may be a substituted or unsubstituted polyphenyl compound. Examples of such liquid crystal compounds include, 4-alkenyloxy-4'-cyanobiphenyl compounds such as 4-allyloxy-4'-cyanobiphenyl (3OCB), and other compounds described as a liquid crystal medium such as those disclosed in U.S. Patent Publication 2016/0108317 paragraphs [0089] to [0104], which is hereby incorporated by reference for the purpose of disclosing such liquid crystal compounds.

Alternatively, the aliphatically unsaturated liquid crystal group forming compound may have the following formula.

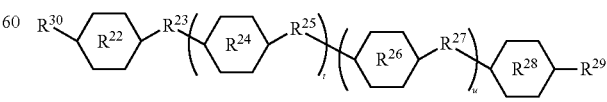

In this formula, ring systems $R^{22}$, $R^{24}$, $R^{26}$, and $R^{28}$; divalent groups $R^{23}$, $R^{25}$, and $R^{27}$; terminal group $R^{29}$; and subscripts t and u are as described above. Group $R^{30}$ is an aliphatically unsaturated group which is used to covalently bond the liquid crystal group to a silicon atom in the SiH rich intermediate via a hydrosilylation reaction. For example $R^{30}$ can be an alkenyl or alkenyloxy group. Alternatively, $R^{30}$ may be an alkenyloxy group such as $CH_2=CH-(CH_2)_n-O-$, where subscript n is as described above. An exemplary aliphatically unsaturated liquid crystal group forming compound is

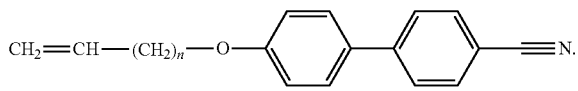

Hydrosilylation involves reaction of the hydrogen atoms in ingredient (ii) and the aliphatically unsaturated groups of ingredient (i), and hydrosilylation is typically catalyzed with a platinum group metal catalyst. Hydrosilylation reaction catalysts that may be used in the method are known in the art and are commercially available. Such conventional hydrosilylation catalysts can be a metal selected from platinum, rhodium, ruthenium, palladium, osmium, and iridium. Alternatively, the hydrosilylation catalyst may be a compound of such a metal, for example, chloroplatinic acid, chloroplatinic acid hexahydrate, platinum dichloride, and complexes of said compounds with low molecular weight organopolysiloxanes or platinum compounds microencapsulated in a matrix or core/shell type structure. Complexes of platinum with low molecular weight organopolysiloxanes include 1,3-diethenyl-1,1,3,3-tetramethyldisiloxane complexes with platinum. These complexes may be microencapsulated in a resin matrix. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. Nos. 4,766,176 and 5,017,654. A catalytically effective amount of hydrosilylation catalyst is added to effect hydrosilylation in the above hydrosilylating steps. The aliphatically unsaturated liquid crystal group forming compound, and the SiH rich intermediate are present in amounts such that the molar amount of hydrogen in the SiH component is greater than the molar amount of aliphatically unsaturated group in the aliphatically unsaturated liquid crystal group forming compound. The resulting non-linear side chain liquid crystal polyorganosiloxane contains some SiH functionality in addition the Si—$R^2$ functionality formed by the hydrosilylation reaction.

The SiH rich intermediate for use in the method described above may be prepared by a method comprising:
1) hydrosilylating ingredients comprising ingredient (A) and ingredient (B), where
Ingredient (A) is a cyclic polyorganohydrogensiloxane of formula

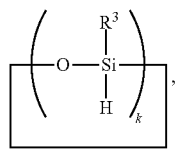

where subscript k is 3 to 12 and each $R^3$ is independently a monovalent hydrocarbon group or a monovalent halogenated hydrocarbon group; and Ingredient (B) is an aliphatically unsaturated siloxane oligomer of formula:

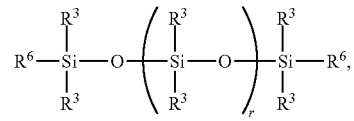

where each $R^6$ is aliphatically unsaturated monovalent hydrocarbon group and subscript r is 0 to 2.

The monovalent hydrocarbon group for $R^3$ may be an alkyl group, a cycloalkyl group, an aryl group, an aralkyl group, an alkenyl group, or an alkynyl group as defined below. The monovalent halogenated hydrocarbon group for $R^3$ is as defined below. Alternatively each $R^3$ is independently an alkyl group or an aryl group. Alternatively, each $R^3$ is an alkyl group. Alternatively, each $R^3$ is methyl, ethyl, propyl, or hexyl. Alternatively, each $R^3$ is methyl. Subscript k is 3 to 12, alternatively 3 to 6. Alternatively, subscript k may have an average value of 4. Each $R^6$ may be an alkyl group or an alkynyl group. Alternatively, $R^6$ may be vinyl or allyl. Subscript r is 0 to 2, alternatively 0 or 1. Alternatively, subscript r is 0.

This embodiment of the method produces a reaction product comprising a type (III) SiH rich intermediate. The type (III) SiH rich intermediate is a polycyclic polyorganohydrogensiloxane having linear polyorganosiloxane segments linking silicon atoms in different rings through divalent hydrocarbon groups. The type (III) SiH rich intermediate comprises units of formulae: $(R''R^3SiO_{2/2})$ $(HR^3SiO_{2/2})$ $(DR^3_2SiO_{1/2})$ $(R^3_2SiO_{2/2})$, where D, R" and $R^3$ are as defined above.

The divalent hydrocarbon groups D are formed by the hydrosilylation of H and $R^6$. Suitable divalent hydrocarbon groups are as described above for the divalent hydrocarbon groups for $R^1$. Each divalent hydrocarbon group is bonded to another unit in the non-linear side chain liquid crystal polyorganosiloxane through covalent bond R".

The above method may alternatively further comprise adding ingredient (C) before and/or during hydrosilylating ingredients comprising (A) and (B), where ingredient (C) is a SiH functional polyorganosiloxane of formula

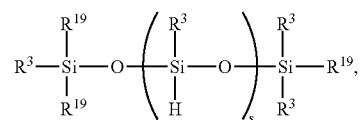

where each $R^{19}$ is independently H or $R^3$ (as described above) and subscript s is >0, alternatively 1 to 100.

This embodiment of the method produces a reaction product comprising a type (II) SiH rich intermediate. The type (II) SiH rich intermediate is a polycyclic polyorganohydrogensiloxane having linear and branched polyorganosiloxane segments linking silicon atoms in different rings through divalent hydrocarbon groups. The type (II) SiH rich intermediate comprises units of formulae: $(R''R^3SiO_{2/2})$ $(HR^3SiO_{2/2})$ $(DR^3_2SiO_{1/2})$ $(R^3_2SiO_{2/2})$ $(R^3_{(2-ee)}R^{19}_{ee}R''SiO_{1/2})$ where D, R", $R^3$ and $R^{19}$ are as described above, and
subscript ee is 0 or 1.

A type (III) non-linear side chain liquid crystal polyorganosiloxane may be made by a method comprising: hydrosilylating ingredients comprising:

(i) the type (III) SiH rich intermediate described above, and (ii) the aliphatically unsaturated liquid crystal group forming compound described above.

Alternatively, a type (II) non-linear side chain liquid crystal polyorganosiloxane may be made by a method comprising: hydrosilylating ingredients comprising:

(i) the type (II) SiH rich intermediate described above, and (ii) the aliphatically unsaturated liquid crystal group forming compound described above.

Alternatively, the method for making the SiH rich intermediate may comprise 1) equilibrating ingredients comprising ingredients (A), (B), and (C2), where Ingredient (A) is a cyclic polyorganohydrogensiloxane of formula

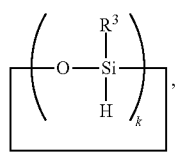

where subscript k is 3 to 12 and each $R^3$ is independently a monovalent hydrocarbon group or a monovalent halogenated hydrocarbon group as described above; and Ingredient (B) is an aliphatically unsaturated siloxane oligomer of formula:

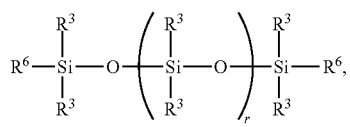

where each $R^6$ is aliphatically unsaturated monovalent hydrocarbon group as defined above and subscript r is 0 to 2, alternatively 0 or 1, and Ingredient (C2) is a hydrogen terminated polydiorganosiloxane oligomer of formula:

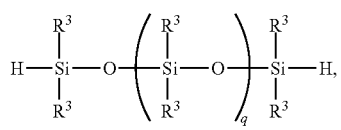

where $R^3$ is as defined above and subscript q is 0 to 2, thereby forming an equilibration product, where the equilibration product comprises an intermediate comprising units of formulae $(R^{20}R^3{}_2SiO_{1/2})(R^3HSiO_{2/2})(R^3{}_2SiO_{2/2})$, where each $R^{20}$ is independently a hydrogen atom or an aliphatically unsaturated monovalent hydrocarbon group as defined for $R^6$; and 2) hydrosilylating ingredients comprising:

(D) the equilibration product of step 1), and (E) additional cyclic polyorganohydrogensiloxane of formula

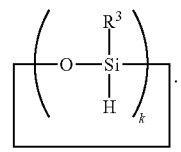

This embodiment of the method makes a type (I) SiH rich intermediate. The type (I) SiH rich intermediate is a polycyclic polyorganohydrogensiloxane having linear and branched polyorganosiloxane segments linking silicon atoms in different rings through divalent hydrocarbon groups. The type (I) SiH rich intermediate comprises units of formulae $(R^{20}R^3{}_2SiO_{1/2})$ $(R^3HSiO_{2/2})$ $(R^3{}_2SiO_{2/2})$ $(R''R^3SiO_{2/2})$ $(DR^3{}_2SiO_{1/2})$, where D, R'', $R^3$, and $R^{20}$ are as described above Alternatively, a type (I) non-linear side chain liquid crystal polyorganosiloxane may be made by a method comprising: hydrosilylating ingredients comprising:

(i) the type (I) SiH rich intermediate described above, and (ii) the aliphatically unsaturated liquid crystal group forming compound described above.

Alternatively, the SiH rich intermediate may be prepared by a method comprising: equilibrating ingredients comprising (a) a branched organohydrogensiloxy-compound of formula

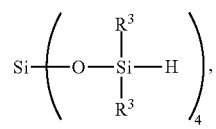

and (b) a cyclic polydiorganohydrogensiloxane of formula

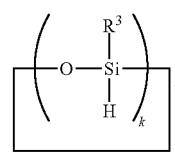

where subscript k is 3 to 12; thereby preparing a Q-branched SiH rich intermediate of formula

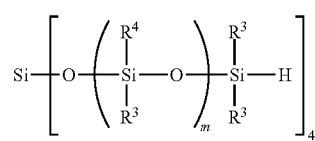

where subscript m is >0, and each $R^4$ is independently a hydrogen atom or $R^3$, with the proviso that at least some of $R^4$ are hydrogen atoms.

The Q branched non-linear side chain liquid crystal polyorganosiloxane may be made by a method comprising: hydrosilylating ingredients comprising:

(i) the Q branched SiH rich intermediate described above, and (ii) the aliphatically unsaturated liquid crystal group forming compound described above.

In each hydrosilylating step and each equilibrating step in the methods described above, a catalyst is typically used to catalyze the reaction. Hydrosilylation catalysts are as described above. Equilibration catalysts are known in the art and include triflate catalysts such as trifluoromethane-sulfonic acid. Equilibration catalysts are commercially available, for example, DOWEX catalysts, which are commercially available from the Dow Chemical Company of Midland, Mich., USA. The equilibration catalyst may be used in an amount of 0.1% to 1% by weight of all ingredients used in the equilibrating step.

Composition

The non-linear side chain liquid crystal polyorganosiloxane described above may be used in a silicone liquid crystal composition to obtain balanced EO responses without compromising a desired low haze in the clear or light transmitting state. A silicone liquid crystal composition comprising the non-linear side chain liquid crystal polyorganosiloxane is useful in EO applications and devices. The composition may be a thermotropic liquid crystal composition. Alternatively, the composition may be a smectic A ("SmA") liquid crystal composition. The non-linear SCLCP may be used in a silicone liquid crystal ("SiLC") composition.

A SiLC composition useful in EO applications and devices comprises:
Ingredient (A) the non-linear side chain liquid crystal polyorganosiloxane described above, and
Ingredient (B) a second liquid crystal material that differs from ingredient (A). The SiLC composition may optionally further comprise one or more of ingredients (C) to (I), where:
Ingredient (C) is an ionic dopant,
Ingredient (D) is a dye,
Ingredient (E) is a pigment,
Ingredient (F) is a spacer,
Ingredient (G) is an additive to tune liquid crystal properties,
Ingredient (H) a monomer, and
Ingredient (I) a catalyst capable of polymerizing the monomer.

Ingredient (A) is the non-linear side chain liquid crystal polyorganosiloxane described above. In one embodiment, ingredient (A) is a type (I) non-linear side chain liquid crystal polyorganosiloxane. Alternatively, ingredient (A) may be a type (II) non-linear side chain liquid crystal polyorganosiloxane. Alternatively, ingredient (A) may be a type (III) non-linear side chain liquid crystal polyorganosiloxane. Alternatively, ingredient (A) may be a Q branched non-linear side chain liquid crystal polyorganosiloxane. Ingredient (A) is used in an amount sufficient to obtain balanced EO responses without compromising the transmitting state. The amount will depend on various factors including the type of non-linear side chain liquid crystal polyorganosiloxane selected for ingredient (A), the width of the gap in the device in which the SiLC composition will be used and the type and amounts of additional ingredients added to the SiLC. However, the amount of ingredient (A) in the SiLC composition may be 1% to 10% based on combined weights of all ingredients in the composition.

Ingredient (B) is a second liquid crystal material that differs from ingredient (A). Ingredient (B) may be a liquid crystal polyorganosiloxane other than the non-linear side chain liquid crystal polyorganosiloxane described above, an organic liquid crystal component, or a combination thereof. The liquid crystal polyorganosiloxane for ingredient (B) may be a SCLCP that differs from the non-linear SCLCP described above, e.g., ingredient (B) may be a linear SCLCP.

Exemplary liquid crystal polyorganosiloxanes are disclosed, for example, in U.S. Pat. No. 4,774,028 to Imai et al., U.S. Pat. No. 4,981,607 to Okawa et al., U.S. Pat. Nos. 5,455,697; 5,547,604; and 8,980,383 each to Coles et al., and U.S. Pat. No. 8,956,548 to Clapp et al. All of the liquid crystal polyorganosiloxanes in these references differ from ingredient (A) in that ingredient (A) is branched (more highly branched) than any of the liquid crystal polyorganosiloxanes described previously. For example, the type (I), type (II) and type (III) non-linear side chain liquid crystal polyorganosiloxanes for ingredient (A) each contain units of formulae $(R''R^3SiO_{2/2})$ and $(DR^3_2SiO_{1/2})$ as described above, and these units are not present in any previously described side chain liquid crystal polyorganosiloxanes. The Q branched non-linear side chain liquid crystal polyorganosiloxane differs from the side chain liquid crystal polyorganosiloxanes disclosed previously in that the Q branched non-linear side chain liquid crystal polyorganosiloxane comprises units of formula $(R^1R^2SiO_{2/2})$, particularly where $R^2$ is a liquid crystal group exhibiting a smectic liquid crystal phase.

A suitable side chain SCLCP for ingredient (B) may have the formula:

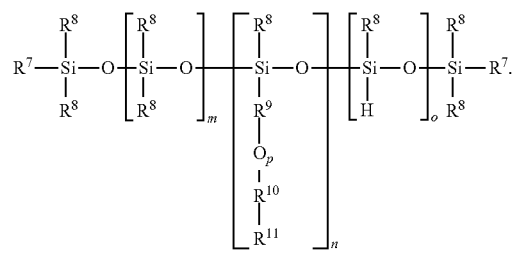

In this formula, each $R^7$ is independently an alkyl group or a liquid crystal group (as described above for $R^2$). Each $R^8$ is independently an alkyl group of 1 to 3 carbon atoms. Each $R^9$ is independently an alkylene group of 3 to 20 carbon atoms, alternatively 4 to 12 carbon atoms. Each $R^{10}$ is independently a phenylene group or a cyclohexylene group, where the groups are bonded together in para positions. Each $R^{11}$ is independently a halogen atom, a cyano group, $NH_2$, $NO_2$, $N(CH_3)_2$, NCS, $CH_3$, $OCH_3$, $CF_3$, $OCF_3$, $CH_2F$, or $CHF_2$. Subscript m is 0 to 100, subscript n is 1 to 100, subscript o is 0 to 100, and a quantity (m+n+o) has an average value of 3 to 200, alternatively 5 to 20. Alternatively, subscript m may be 0. Subscript p is 0 or 1.

Other suitable liquid crystal polyorganosiloxanes for ingredient (B) are exemplified by siloxane oligomer derivatized organic compounds of formula:

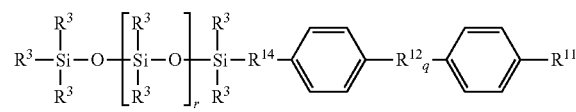

where $R^3$ and $R^{11}$ are as defined above, subscript q is 0 or 1, subscript r is 0 to 5, $R^{12}$ is a covalent bond or a divalent group of formula COO or OOC, or phenylene; and $R^{14}$ is an alkylene group, an alkenyloxy group, or a carboxyalkylene group. Examples include 4-(x-(trimethylsiloxy-dimethylsilyl)-n-alkoxy)-4'-cyanobiphenyls, where x may be 2 to 20, alternatively 3 to 12, for example 4-(8-(trimethylsiloxy-dimethylsilyl)-n-octyloxy)-4'-cyanobiphenyl.

Suitable organic liquid crystal components for ingredient (B) include thermotropic liquid crystal compounds exhibiting a liquid crystal phase, alternatively a smectic phase. Alternatively, the organic liquid crystal component for ingredient (B) may exhibit a SmA mesophase. Examples of SmA organic liquid crystal compound classes include polyphenyl functional compounds such as alkenyloxy cyanobiphenyl, alkenyloxy cyanoterphenyl, alkenylcyanobiphenyl, or alkenyloxycyanoterphenyl. Exemplary compounds include 4-allyloxy-4'-cyanobiphenyl (3OCB); 4'-pentyl-4-biphenylcarbonitrile (5CB); 4'(pentyloxy)-4-biphenylcarbonitrile (5OCB); and 4'-octyl-4-biphenylcarbonitrile (8CB); 4'-(octyloxy)-4-biphenylcarbonitrile (8OCB). Alternatively, the organic liquid crystal component may have formula:

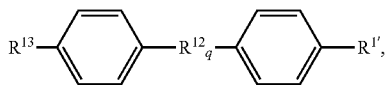

where $R^{11}$ and $R^{12}$ and subscript q are as defined above, and $R^{13}$ is an alkyl group, an alkoxy group, or a carboxy-alkyl group. Alternatively, ingredient (B) may be a compound of formula:

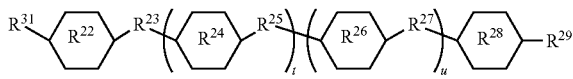

In this formula, ring systems $R^{22}$, $R^{24}$, $R^{26}$, and $R^{28}$; divalent groups $R^{23}$, $R^{25}$, and $R^{27}$; terminal group $R^{29}$; and subscripts t and u are as described above. Group $R^{31}$ is selected from an alkyl group, an alkenyl group, an alkoxy group, an alkenyl group, and alkenyloxy group.

The amount of ingredient (B) in the SiLC composition depends on various factors including the species selected for component (A), the species selected for ingredient (B), and whether any of ingredients (C) to (F) are present. However, the amount of ingredient (B) in the SiLC composition may be >0% to 90%, alternatively 50% to 70%, and alternatively 1% to 10%, based on combined weights of all ingredients in the SiLC composition.

Ingredient (C) is an ionic dopant. Without wishing to be bound by theory, it is thought that, when present, the ionic dopant migrates through the composition when low frequency electric (or dc) fields are applied across the composition, thereby disrupting the order to the composition. Order in the composition can be restored by applying a higher frequency field that does not allow the dopant time to migrate significantly and yet causes the liquid crystals to align with each other and with respect to the field (either perpendicular or parallel, depending on the composition of the liquid crystal).

The ionic dopant may be any ionic dopant used in dynamic scattering devices, such as those disclosed in PCT Publication WO2004/022670, "Liquid Crystal Dopants." The ionic dopant may comprise a sulphur or phosphorus containing anion with a random cation for use in a SmA liquid crystal composition. The anion may be one of $S^-$, $SO_2^-$, $SO_3^-$, $SO_4^-$, $NHSO_3^-$, $POH^-$, $PO_2H^-$, $PO_3H^-$, $(PO_3)^{2-}$, $PO_4H^-$, or $(PO_4)^{2-}$. The cation in such ionic dopant may have a heterocyclic base, such as an N-alkylpyridine, an N—N'-dialkylimidazole, an N—N'-dialkylbenzimidazole, and N—N'-dialkyltriazole, an N-alkylquinuclidine, or an N-alkylazanaphthalene.

Alternatively, the ionic dopant may be a quaternary ammonium compound, for example having formula: $(R^{15}R^{16}R^{17}R^{18}N)^+$, $X^-$, where $R^{15}$, $R^{16}$, $R^{17}$ and $R^{18}$ may be independently H, an alkyl group, a silyl terminated alkyl group, or a siloxane terminated alkyl group. Each alkyl group may be the same or different. Alternatively, $R^{15}$, $R^{16}$ and $R^{17}$ may each be an alkyl group; alternatively $R^{15}$, $R^{16}$, and $R^{17}$ may each be H. $R^{18}$ may be an alkyl group of more than 8 carbon atoms, alternatively 12 to 18 carbon atoms. The counterion, X—, may be a halogen atom such as Br— or Cl—, or a perchlorate anion. Without wishing to be bound by theory, it is thought that use of a tetraalkyl dopant in which at least one of $R^{15}$, $R^{16}$, $R^{17}$ and $R^{18}$ has a silyl or a siloxane terminal group is especially beneficial because it may impart further solubility control on the ionic dopant.

The amount of ionic dopant in the SiLC composition will depend on various factors including the amounts and species selected for ingredients (A) and (B), however, the ionic dopant may be present in an amount of 10 parts per million (ppm) to 400 ppm, alternatively 0.1% to 0.6% based on combined weights of all ingredients in the SiLC composition.

Ingredient (D) is a dye. Suitable dyes are organic compounds, which may be molecules smaller in size than those of pigments or having solubilizing groups that allow the dye to solubilize in the composition in which the dye is incorporated. Suitable dyes include dichroic dyes, emissive dyes, and/or pleochroic dyes, such as absorbing dyes, fluorescent dyes, or both absorbing and fluorescent. The dye may be an anthraquinone compound (including polycyclic quinones), an azo compound, a polymethine (e.g., cyanines), an indigoid compound, a phthalocyanine compound, an aryl carbonium compound (e.g., triarylmethanes), or a perylene compound. Exemplary dyes are known in the art and described for example, in *Chromic Phenomena, Technological Applications of Colour Chemistry* by Peter Bamfield, The Royal Society of Chemistry, 2001 ("Bamfield") pp. 80-112 and 131; in *Liquid Crystal Applications and Uses*, vol. 3, Chapter 11 Dichroic Liquid Crystal Displays by Birendra Bahadur, World Scientific Publishing Co. Pte. Ltd., Singapore, 1992, pp. 65-208, and in U.S. Patent Publication 2016/0108317.

The amount of dye in the SiLC composition will depend on various factors including the amounts and species selected for ingredients (A) and (B), however, the dye may be present in an amount of 0% to 5%, alternatively 0.2% to 2%, and alternatively 0.3% to 5%, based on weight of all ingredients combined in the composition.

Ingredient (E) is a pigment. Pigments are colored, black, white or fluorescent particulate organic and/or inorganic solids, which are usually insoluble in, and dispersed in, the composition in which they are incorporated. Suitable pigments for use in the composition described herein are exemplified by those disclosed in U.S. Patent Application 2013/0342773 to Chu, et al. and those disclosed by Bamfield at pages 112-128. Organic pigments include carbazoles, perinones, perylenes, vat pigments, benzimidazolones, isoindolinones, diketopyrrolo pyrroles, and thiazine indigos. Inorganic pigments include iron oxides, chromium oxide, mixed oxides, cadmium pigments, chromate pigments, ultramarine pigments, and iron blue pigments. Other examples of pigments include optically anisotropic pigment particles, such as azo type organic pigments which include organic groups with an —N═N— link. Azo type organic pigments include benzimidazolone compounds. Alternatively, the pigment may be a polycyclic type organic pigment, such as diketopyrrolo-pyrrole. Alternatively, the pigment may be a chelated transition metal such as copper phthalocyanine, for example Hostaperm 8 G or PV fast A2 R (both available from Clariant). Alternatively, the pigment may be quinacridone compound. Alternatively, the pigment may be an inorganic pigment, such as a white organic pigment exemplified by $ZnTiO_4$, $BaTiO_4$, and $TiO_2$; or a black inorganic pigment such as carbon black, Flexoprint Black CB01, or Hostaprint Black L32 from Clariant. The amount of pigment in the SiLC composition depends on various factors including the type of pigment selected and the types and amounts of other ingredients added to the composition, however, the amount of pigment may be 0 to 50% of the combined weight of all ingredients in the composition, alternatively 0 to 25%, alternatively 0% to 5%, alternatively 1% to 5%.

For purposes of this application, dyes and pigments are distinct from one another. Dyes are molecular species that are at least partially soluble in the composition, and pigments are particulates that are insoluble in the composition.

Ingredient (F) is a spacer (particulate). Spacers can comprise organic particles, inorganic particles, or a combination thereof. Spacers can have a particle size of 4 micrometers to 30 micrometers, alternatively 5 micrometers to 25 micrometers, and alternatively 6 micrometers to 20 micrometers. Spacers can comprise monodisperse spherical beads, such as glass, ceramic, or polymer (e.g., polystyrene) beads. Alternatively, spacers may be chopped glass fibers. Spacers are commercially available and include Micropearl SP-210 (10 micron spacer) or Micropearl SP-215 (15 micron spacer) made by Sekisui Chemical Co. The amount of ingredient (F) depends on various factors including the particle size distribution and pressure to be applied during placement of the composition. However, the composition may contain an amount of ingredient (F) ranging from 0% to 5%, alternatively 0.05% to 5%, alternatively 0.2% to 2% based on combined weights of all ingredients in the composition. Ingredient (F) may be added to control the width of the gap in which the composition described herein will be interposed between substrates in an EO device.

Ingredient (G) is an additive to tune liquid crystal properties of the SiLC composition. The additive may be a polydimethylsiloxane. Additives suitable for ingredient (G) may be capable of increasing or lowering birefringence. Suitable additives are disclosed in U.S. Pat. No. 8,956,548 to T. Clapp et al, "Liquid Crystal formulations and structures for smectic A optical devices." Without wishing to be bound by theory, it is thought that the extent of conjugation within rod-shaped aromatic components can strongly influence the birefringence of the component and the composition to which it is added. For example, exchanging one or more phenyl rings (e.g., in an organic liquid crystal compound described above for ingredient (B)) for a cyclohexyl ring system is known to reduce birefringence (B. Bahadur, Liquid Crystals Applications and Uses, Volume 1 (ISBN 981-02-0110-9), Chapter 4 Physical Properties of Liquid Crystals), while compounds such as those disclosed in (Ref 6. S. T. Wu "Molecular design strategies for high birefringence liquid crystals" MRS Volume 709, p 219-228, 2002) can be used to increase birefringence. When present in the composition, ingredient (G) is selected to be distinct from ingredient (B).

Ingredient (H) is a monomer, and ingredient (I) is a catalyst for polymerizing the monomer. Suitable monomers include acrylates, methacrylates, vinyl compounds, vinyloxy compounds, propenyl ethers, epoxy compounds such as oxiranes and oxetanes, vinyl ketones, acryloyloxy compounds, and methacryloyloxy compounds. The catalyst for such a monomer may be any suitable initiator, such as a photoradical polymerization initiator. Examples include 4-methoxyphenyl-2,4-bis(trichloromethyl)triazine; 2-(4-butoxystyryl)-5-trichloromethyl-1,3-4-oxadiazole; 9-phenylacridine; 9,10-benzphenazine; a hexaarylbiimidazol-mercaptobenzimidazole mixture; 1-(4-isopropylphenyl)-2-hydroxy-2-methylpropane-1-one; benzyldimethylketal; 2-methyl-1-[4-(methylthio)phenyl]-2-morpholinopropane-1-one; and a benzophenone-methyltriethanolamine mixture. Suitable monomers and catalysts are disclosed, for example, in U.S. Patent Publication 2016/0090534, "Piperidine Derivative, Liquid Crystal Composition and Liquid Crystal Display Device."

Apparatus

FIG. 1 shows a cross section of an exemplary smectic dynamic scattering mode electro-optic (EO) device. The device includes a first light transmitting substrate 1 having a first light transmitting electrode 3 on a first surface 8 of the first light transmitting substrate 1. The device further includes a second substrate 2 having a second electrode 3' on a second surface 8' of the second substrate 2. The first light transmitting substrate 1 and the second substrate 2 are spaced apart from one another by a spacer 6 such that a gap forms between the electrodes 3, 3' on the surfaces 8, 8' of the substrates 1, 2. A liquid crystal composition 5, described above, is interposed in the gap. The device further includes and edge seal 7, surrounding perimeter of the gap so as to contain the liquid crystal composition 5 within the gap. The device may optionally further comprise an interfacial layer 4 on the surfaces 8, 8' of the substrates 1, 2. The device may optionally further comprise a barrier layer 9, 9' between one or both surfaces 8, 8' of the substrates 1, 2 and one or both electrodes 3, 3'.

Figure 2:
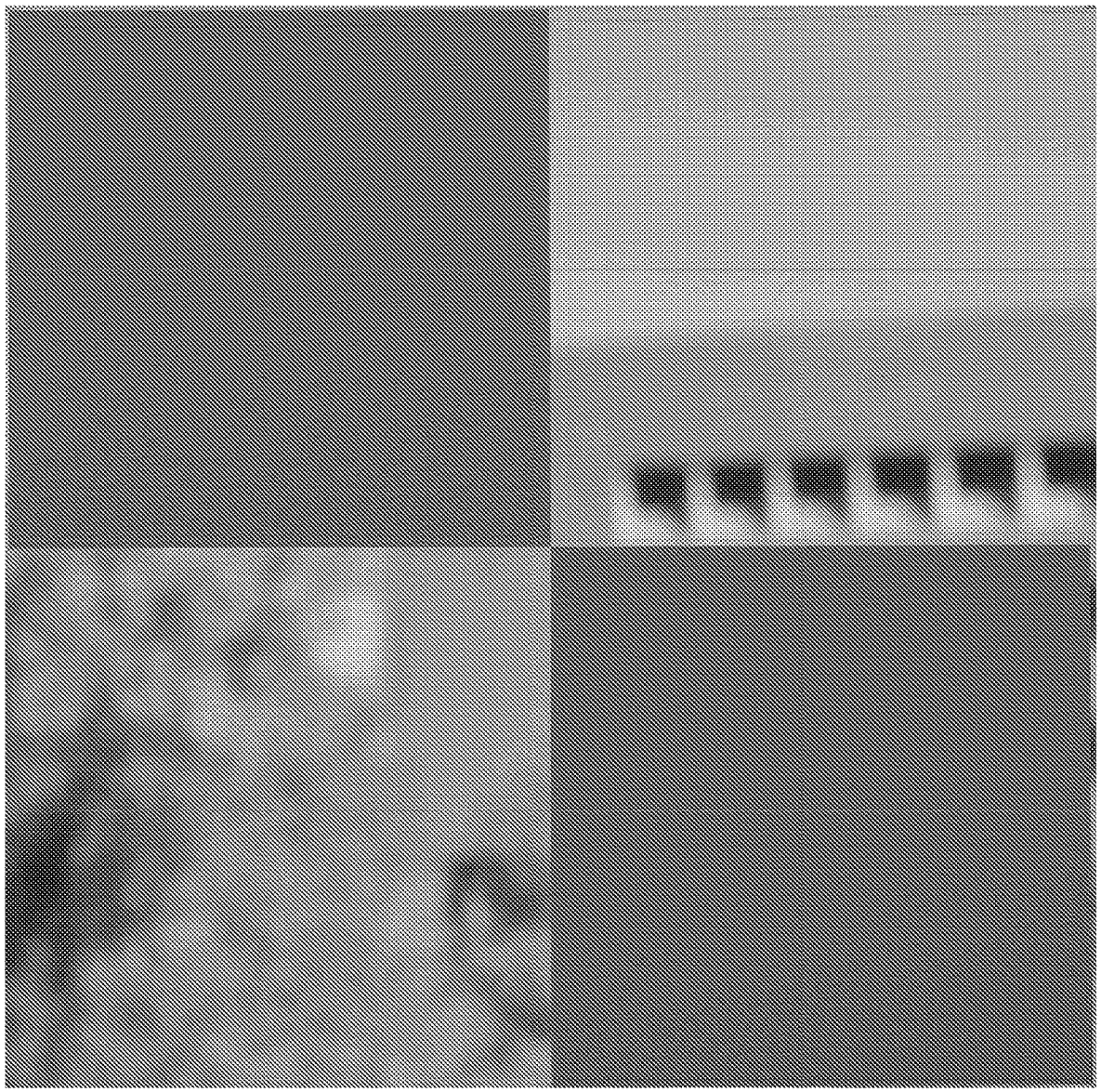
FIG. 2 is a photographic image of a portion of a Dynamic Scattering Mode device with four independently addressable segments, showing transmitting (top right and bottom left) and scattering (top left and bottom right) states of the device. Both clear and scattering states are stable and no power is being applied to the device.
Figure 3:
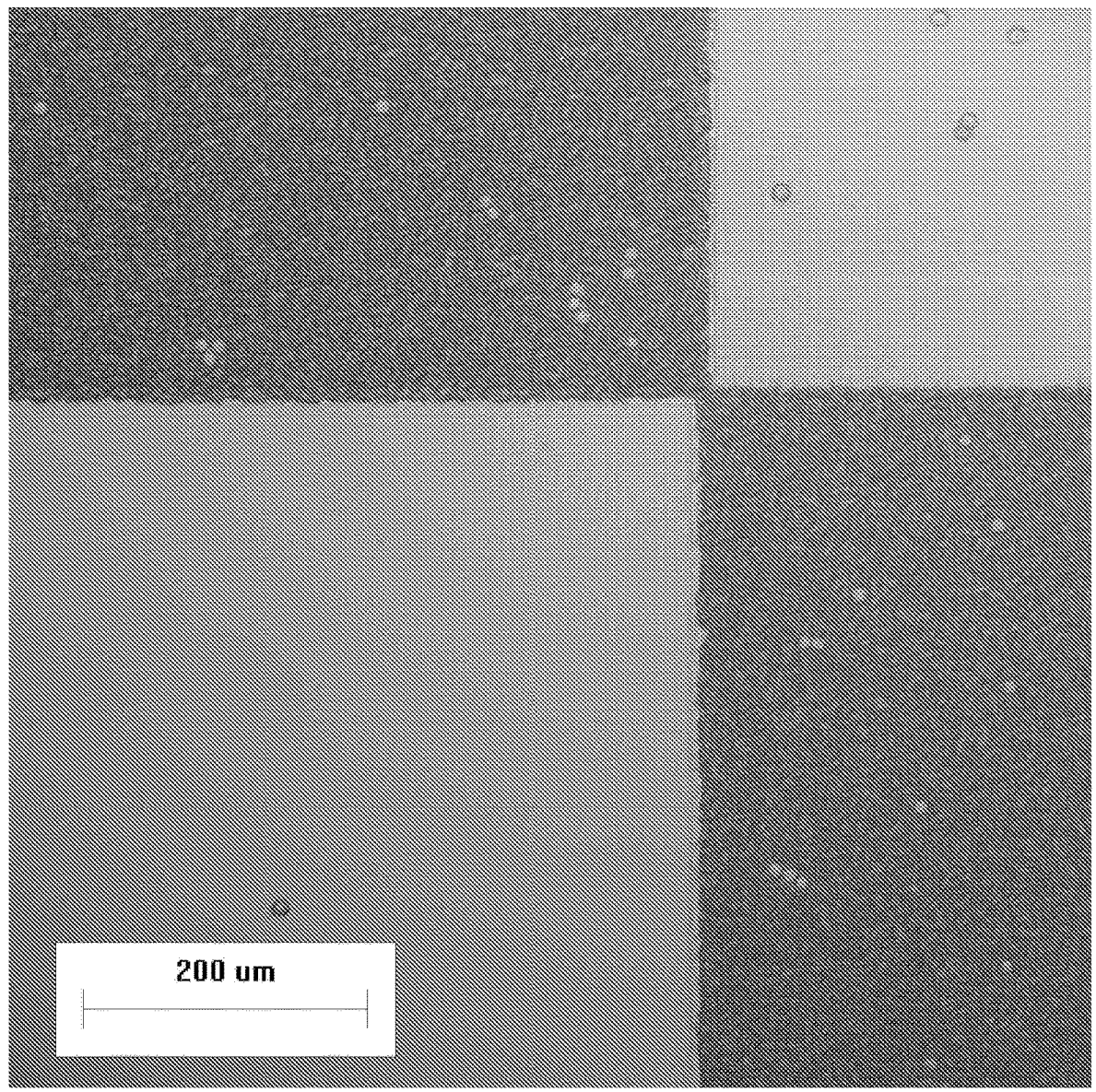
FIG. 3 is a magnified image of the four addressable segments shown in FIG. 2.

FIG. 1 is included to demonstrate the invention to those of ordinary skill in the art. However, those of skill in the art should, in light of the present disclosure, appreciate that many changes can be made in the specific embodiments which are disclosed and still obtain a like or similar result without departing from the spirit and scope of the invention set forth in the claims. For example, either or both of the substrates may be light transmitting and/or either or both of the electrodes may be light transmitting. Alternatively, either or both of the substrates may be transparent. Either or both of the substrates may be glass or plastic, and the substrates may be the same or different. The spacer used to control the width of the gap may be a particulate dispersed in the liquid crystal composition, or the spacer may be, for example, a polyorganosiloxane elastomer printed on a surface 8 and/or 8' of a substrate 1 and/or 2, or the spacer may be a separate part of the device independent of the composition, or alternatively two or more types of spacers may be used in the same device. The interfacial layer 4 is optional. When present, the interfacial layer may be on one or both of the electrodes 3, 3'. The interfacial layer 4 may cover all or a portion of one or both electrodes 3, 3'. The interfacial layer 4 may be an inorganic dielectric or polymeric layer. The barrier layer 9, 9' may be a thin layer of silicon dioxide to provide an ion barrier, e.g., when a substrate 1, 2 comprises soda lime glass, or to provide a barrier to gas or moisture when a plastic substrate 1, 2, is used. The device may alternatively be segmented, such that the liquid crystal composition 5 is formed in segments between the substrates 1, 2. Alternatively, the device may be sectioned by segmenting transparent conductive oxide (TCO) coatings, such that the liquid crystal composition in each section can be electrically addressed independently of the other sections. FIGS. 2 and 3 show an example of segmentation.

The non-linear SCLCP, liquid crystal composition, and EO device described above may be used in light diffusion and/or light modulation applications. For example, specific applications include, but are not limited to, smart glazing applications (e.g., privacy glazing), automotive glazing (e.g., sunroofs, side windows), greenhouses, displays, signage, and/or projection surfaces.

EXAMPLES

These examples are intended to illustrate some embodiments of the invention and should not be interpreted as limiting the scope of the invention set forth in the claims. The following ingredients were used in the examples. Reference Examples are not prior art unless so indicated. In the examples below, "Me" refers to a methyl group. $M^{Vi}$ represents a dimethyl,vinyl siloxy unit of formula $[(CH_3=CH_2)(CH_3)_2SiO_{1/2}]$ and $M^H$ represents a dimethyl,hydrogen siloxy unit of formula $[H(CH_3)_2SiO_{1/2}]$

Reference Example 1—Synthesis of $M^{Vi}$ and $M^H$-Terminated MeH Siloxane Linear Polymeric Intermediate 13.43 g 1,1,3,3-tetramethyldisiloxane, 9.32 g 1,3-divinyltetramethyldisiloxane, and 180.42 g cyclic polymethylhydrogensiloxane copolymer were mixed in a 500 ml 3-neck flask with condenser, magnetic stir bar, and thermocouple. 5.0 g DOWEX DR-2030 catalyst, which is commercially available from the Dow Chemical Company of Midland, Mich., USA was added to the flask and the solution was stirred under nitrogen at 65° C. for 5 hours. The catalyst was filtered out after the temperature was cooled to 35° C. Then 3.7 g $CaCO_3$ was added to neutralize residual acid for >2 hours. $CaCO_3$ was then filtered out. The equilibration product (189.8 g) was collected and contained an intermediate with a target DP=12 and molar ratio of $M^H/M^{Vi}$=2.

Reference Example 2—Synthesis of Type I SiH Rich Intermediate 43.0 g of the $M^{Vi}$ and $M^H$-terminated MeH siloxane linear polymeric intermediate prepared in Reference Example 1 was mixed with 43.0 g of the same cyclic polymethylhydrogensiloxane used in Reference Example 1 and 107 g toluene in a 250 ml 3-neck flask with magnetic stir bar, Dean stark/condenser, and thermocouple. Moisture was removed by distillation of 84 g of toluene out. The solution was cooled to 85° C. 0.31 g Pt/toluene solution (1000 ppm) was added to the solution under vigorous stirring. There was a temperature rise of 3.3° C. afterwards. The flask temperature was set at 85° C. After 50 minutes, the mixture was cooled to 35° and transferred a 200 ml receiving flask for solvent removal by rotary evaporation. Volatiles were removed at ~80° C. and 0.1-0.5 mmHg for 40 minutes. The product (48.9 g) was collected in a predried suitable container and stored in a desiccator. The H (as SiH) content was calculated as 1.45%. This SiH rich intermediate was used to make sample BP11 in the tables below.

Reference Example 3—Synthesis of Branched Type 11 SiH Rich Intermediate 52.0 g linear polymethylhydrogensiloxane having a DP of 14 was mixed with 52.1 g of the same cyclic polymethylhydrogensiloxane used in Reference Example 1 and 5.2 g divinyltetramethyldisiloxane in a 200 ml receiving flask. 0.30 g Pt/toluene solution (1000 ppm) was added to the mixture. The flask was rotated on an apparatus for solvent removal by rotary evaporation for ~10 minutes before dipping into the oil bath which was set at 84° C. Volatiles were removed using rotary evaporation (0.1-0.5 mmHg, 40 minutes). The product (71.0 g) was stored in a desiccator. The H (as SiH) content was calculated as 1.32%. This SiH rich intermediate was used to make sample BP4 in the tables below.

Reference Example 4—Synthesis of Branched Type III SiH Rich Intermediate 40.8 g of the same cyclic polymethylhydrogensiloxane used in Reference Example 1 was mixed with 3.97 g divinyltetramethyldisiloxane in a 200 ml receiving flask. 0.22 g Pt/toluene solution (1000 ppm) was added to the mixture. The flask was rotated on a solvent removal by rotary evaporation for ~45 minutes in the oil bath which was set at 86° C. Volatiles were removed using the rotary evaporator (0.1-0.5 mmHg, 30 minutes). The product (20.7 g) was stored in a desiccator. The H (as SiH) content was calculated as 1.39%. This SiH rich intermediate was used to make sample BP3 in the tables below.

Reference Example 5—Synthesis of Q-Branched SiH Rich Intermediate 235.66 g of the same cyclic polymethylhydrogensiloxane used in Reference Example 1 and 64.45 g tetrakis(methylhydrogensiloxy)silane with formula $(M^H D^H_7)_{3.3}$ Q were mixed in a 500 ml 3-neck flask furnished with condenser, thermocouple, nitrogen sweep, and mechanical stirring. The mixture was heated to 70° C. 0.02 g $H_2O$ and 0.28 g trifluoromethanesulfonic acid were added to the flask under stirring. $M^H$ represents a siloxane unit of formula $(CH_3)_2HSiO_{1/2}$, $D^H$ represents a siloxane unit of formula $(CH_3)HSiO_{2/2}$, and Q represents a siloxane unit of formula $SiO_{4/2}$. The mixture was stirred for 5 hours at 70° C. and then was cooled down to 50° C. 15 g sodium bicarbonate was added to the flask to neutralize the acid. Solids were filtered out and volatiles were removed using a thin film evaporator at 80° C., 15 mmHg. Based on 29Si NMR, the H (as SiH) content was 1.57%. This was used to make samples BP13 and BP15 in the tables below.

Example 1—General Synthetic Procedure for a Non-Linear Side Chain Liquid Crystal Polyorganosiloxanes The non-linear side chain liquid crystal polyorganosiloxanes were synthesized using a similar process. Different non-linear SiH rich intermediates synthesized in Reference Examples 1-5 were used for making different non-linear side chain liquid crystal polyorganosiloxanes of this Example 1. Molar ratio of H content to vinyl content (SiH/Vi) ratio was controlled between 0.95 and 1.00. Pt catalyst was used at ~20 ppm vs the targeted amount of non-linear side chain liquid crystal polyorganosiloxane to be produced.

A general synthetic procedure for the synthesis of sample BP15 shown in the tables below is as follows. In a 3-neck 1 L flask equipped with mechanical stirring, thermocouple, and condenser, 160.3 g 4-allyloxy-4'-cyanobiphenyl (3OCB) were added followed by 395.9 g of Butyl Acetate (ACS grade), and 43.3 g Q-branched SiH rich intermediate prepared in Reference Example 5, and 115.8 g toluene. 109.6 g of the toluene was distilled out at a temperature range between 126.5° C. and 128.5° C. by heating the flask with a heating mantle. The heating mantle was then removed, and the solution temperature was cooled to 80.7°. 2.08 g Pt/butyl acetate solution (2000 ppm) was added to the flask. The temperature rose to 115° C. and then dropped to 114.5° C. The heating mantle was reapplied, and the temperature was set at 125° C. for refluxing. The heating mantle was removed after 5 hours, and the solution temperature was cooled to 60° C. Volatiles were removed by rotary evaporation (97° C., 1.6 mmHg, 1 hour). 266.2 g acetone and 401 g toluene were added to the flask to dissolve the resulting non-linear side chain liquid crystal polyorganosiloxane overnight. The next morning, 8.1 g activated carbon and 8.0 g aminopropyl functional silica gel were added to the flask for Pt and color removal. The mixture was stirred at room temperature of 25° C. for 4 hours before pressure filtration through 0.45 μm pore size membrane. Volatiles were removed at 0.1-0.3 mmHg, 100° C. for 2 hours and 135° for 15 minutes. 171 g of the resulting non-linear side chain liquid crystal polyorganosiloxane (labeled BP15) was collected.

TABLE 1

List of the non-linear SCLCPs prepared as described above, using different SiH rich intermediates.

| BP# | Reference Example of SiH Rich Intermediate | SIH Rich Intermediate Type | SiH/Vi |
|---|---|---|---|
| BP0 | Reference Examples 1 & 2 | I | 0.95 |
| BP1 | see below | I | 0.95 |
| BP2 | see below | I | 0.95 |
| BP3 | Reference Example 4 | III | 0.95 |
| BP4 | Reference Example 3 | II | 0.95 |
| BP5 | see below | Q branch | 0.96 |
| BP6 | see below | Q branch | 0.95 |
| BP7 | see below | I | 0.95 |
| BP8 | see below | I | 0.95 |
| BP9 | see below | I | 0.95 |
| BP10 | see below | II | 0.95 |
| BP11 | Reference Example 1 & 2 | I | 0.95 |
| BP12 | see below | I | 0.95 |
| BP13 | Reference Example 5 | Q branch | 0.95 |
| BP14 | see below | I | 0.95 |
| BP15 | Reference Example 5 | Q branch | 1.00 |

In the table above, BP1 was produced as in Reference Examples 1 and 2, except target DP=22 and half the amount of the cyclic polyorganohydrogensiloxane was used. BP2 was produced as in Reference Examples 1 and 2, except target DP=22. BP5 was produced as in Reference Example 5, except the tetrakis(methylhydrogensiloxy)silane had formula $(M^H D^H{}_{20})_{4.3}$ Q. BP6 was produced as in Reference Example 5, except the tetrakis(methylhydrogensiloxy)silane had formula $(M^H D^H{}_{11})_{3.7}$ Q. BP7 was produced as in Reference Examples 1 and 2, except molar ratio of $M^H/M^{Vi}$ was 3 and target DP=22. BP8 was produced as in Reference Examples 1 and 2, except molar ratio of $M^H/M^{Vi}$ was 1. BP9 was produced as in Reference Examples 1 and 2, except molar ratio of $M^H/M^{Vi}$ was 1. BP10 was produced as in Reference Example 3, except a SiH terminated polymethylhydrogensiloxane with DP=21 was used instead of the linear trimethylsiloxy terminated polymethylhydrogensiloxane having a DP of 14. BP12 was produced as in Reference Examples 1 and 2, except half the amount of the cyclic polyorganohydrogensiloxane was used. BP14 was produced as in Reference Examples 1 and 2, except molar ratio of $M^H/M^{Vi}$ was 4.

Gel Permeation Chromatography ("GPC") using polystyrene standards was used to determine the molecular weight of the non-linear side chain liquid crystal polyorganosiloxanes. Besides the major polymer peak, a low molecular weight peak assigned to unreacted 3OCB and isomerized 3OCB always appeared. GPC results listed in table 5 include Mn, Mw, Mz, and polydispersity (Mw/Mn) as well as the low MW %.

TABLE 2

GPC analytical results of various non-linear side chain liquid crystal polyorganosiloxanes.

| | GPC Results | | | | |
|---|---|---|---|---|---|
| BP# | Mn | Mw | Mz | Mw/Mn | Low MW % |
| BP0 | 11515 | 43221 | 121534 | 3.75 | 22.6% |
| BP1 | 10120 | 71040 | 569691 | 7.02 | 18.2% |
| BP2 | 9323 | 43685 | 242138 | 4.69 | 18.2% |
| BP3 | 2939 | 3753 | 5041 | 1.28 | 34.1% |
| BP4 | 3897 | 6681 | 13092 | 1.71 | 26.7% |
| BP5 | 8821 | 19533 | 39443 | 2.21 | 16.5% |
| BP6 | 7059 | 15035 | 29413 | 2.13 | 18.7% |
| BP7 | 11686 | 43584 | 96708 | 3.73 | 19.0% |
| BP8 | 9522 | 33511 | 88929 | 3.52 | 19.4% |
| BP9 | 9535 | 55669 | 196208 | 5.84 | 28.7% |
| BP10 | 7165 | 24482 | 73640 | 3.42 | 22.5% |
| BP11 | 8269 | 22740 | 50484 | 2.75 | 21.5% |
| BP12 | 4288 | 7383 | 11479 | 1.72 | 23.0% |
| BP13 | 6680 | 15345 | 30302 | 2.30 | 15.0% |
| BP14 | 3275 | 4993 | 6929 | 1.53 | 22.0% |
| BP15 | 2,799 | 4,052 | 5,398 | 1.45 | 21.4% |

Mn refers to number average molecular weight. Mw refers to weight average molecular weight. Mz refers to z average molecular weight. Low MW % refers to the percentage of the low molecular weight portion of the sample.

Various branched type I, type II, and type III, and Q-branched non-linear SCLCPs (BP0-BP15) were formulated into a SiLC composition and the switching performance was tested on demo EO devices.

Comparative Example 1—Preparation and Property of Linear Side Chain Liquid Crystal Polyorganosiloxane Preparation of linear SCLCP 1: In a 3-neck 250 mL flask equipped with a magnetic stirring bar, thermocouple and reflux condenser, 35.12 g (0.1488 mole) of 4-allyloxy-4'-cyanobiphenyl was added followed by 99.68 g of Butyl Acetate (dried with sodium sulfate). Under stirring, the contents of the flask were heated to 88.3° C. and then 9.31 g of linear polymethylhydrogensiloxane with H (as SiH) content 1.52% was added to the flask. The heating mantle was then removed and 1.83 g of a 500 ppm solution of Pt catalyst was added. Upon the addition of the catalyst, the reaction underwent an exotherm reaching ~120° C. When the temperature dropped to 118° C., the heating mantle was put back and the temperature was set at 120° C. After 5 hours of heating, the solution was cooled to RT and transferred to an i-neck flask for solvent removal by rotary evaporation. After solvent removal, the solid was dissolved with 3× weight dichloromethane. 2.25 g of carbon black was added to the flask and allowed to stir magnetically at room temperature overnight. The next day, the contents of the flask was filtered through a 0.22 μm nylon filter using a small pressurized filter into a tared 200 mL tear drop flask. The solution was then stripped of the solvent using a rotary evaporator at a bath temperature of 90° C. Once visually all of the solvent was removed, the flask was allowed to remain at full vacuum at a bath temperature of 90° C. for an additional hour to ensure the complete removal of the volatiles. The resulting product was a linear side chain liquid crystal polyorganosiloxane.

Example 2 (SiLC Composition)

The ingredients in Table 2 below were combined to make organic nematic preformulations. These were combined with the ingredients in Table 3, below, to make silicone liquid crystal compositions.

TABLE 2

Organic Nematic Preformulations

| Organic LC | Formulation 1, Wt % | Formulation 2, Wt % |
|---|---|---|
| 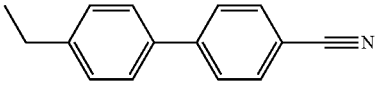 |  | 10.9% |
| 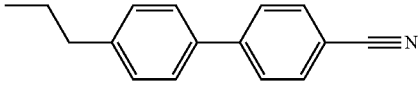 |  | 5.5% |
| 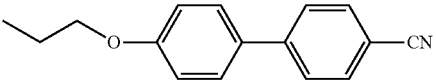 [SMILES: CCCOc1ccc(-c2ccc(C#N)cc2)cc1] | 6.7% | 10.6% |
| 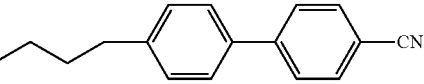 | 32.9% | 46.9% |
| 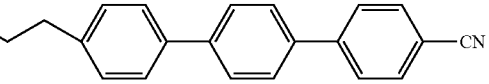 | 23.5% | 11.0% |
|  | 23.8% | 15.1% |
| 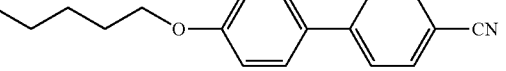 | 13.1% |  |

The blanks in Table 2 indicate 0% of the ingredient was used in the formulation.

TABLE 3

| | Si2-8OCB | Organic nematic preformulation | SCLCP 1 prepared in Comparative Example 1 | Non-linear SCLCP | Ionic Dopants |
|---|---|---|---|---|---|
| Ex. 2-1 | 29.8% | 64.0% Formulation 2 | 4.5% | 1.7% BP0 | 0.59 μmol/g ID #1 |
| Ex. 2-2 | 29.8% | 64.0% Formulation 2 | 6.2% | 0 | 0.59 μmol/g ID #1 |
| Ex. 2-3 | 29.8% | 64.0% Formulation 2 | 0 | 6.2% BP0 | 0.59 μmol/g ID #1 |
| Ex. 2-4 | 40.0% | 50.0% Formulation 1 | 8.3% | 1.7% BP6 | 0.59 μmol/g MTAP |
| Ex. 2-5 | 40.0% | 50.0% Formulation 1 | 10.0% | 0 | 0.59 μmol/g MTAP |

In the table above, MTPA is myristyltrimethylammonium perchlorate and ID #1 is

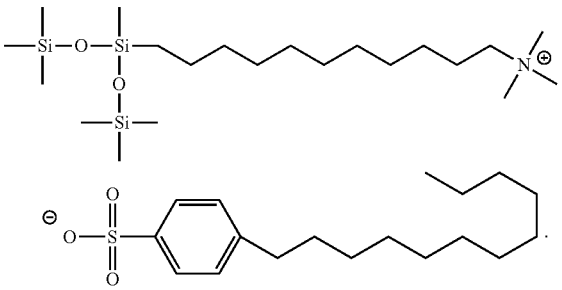

Si2-8OCB is an oligomeric side chain liquid crystal polyorganosiloxane as described in U.S. Pat. No. 8,956,548.

Example 3 (Device)

Preparation of Smart Window Devices Made with SiLC Compositions.

Plastic spacer beads (size and weight percentage specified in Table 4) were added to SiLC composition samples and were mixed via dental mixing. Display ITO glass substrates of 180 mm×165 mm in dimensions were patterned via laser ablation. An amount of 0.7 g-1.0 g of Si-LC sample containing spacer beads was applied to the bottom substrate to form a line 1.5 cm from the leading edge, the top ITO substrate was placed on the bottom one, and the resulting stack was placed on a rubber pad. The spacer beads were Micropearl SP-210 (10 micron spacer) or Micropearl SP-215 (15 micron spacer) made by Sekisui Chemical Co. The whole stack was passed through a ChemInstruments HL-100 laminator twice to make SiLC laminates. After cleaning off excess SiLC composition sample, four electrical contacts were formed by soldering copper wires on exposed portions of the ITO surfaces. Each resulting device had four 7.5 cm×7.5 cm pixels. An electronic driver set at 120V was used to switch each device pixel by pixel. A square waveform of 1200 Hz in frequency was used to switch pixels to clear state, and a square waveform of 50 Hz in frequency was used to witch pixels to scattering state. All devices except Comparative Example 3-3 could be switched to clear state with a low haze (<5%). Time required for switching a pixel at 120V to clear state with a haze <5% was recorded in Table 4 (clearing time). After pixels had stayed in clear state for 60 seconds, they were switched to scattering state (all of the active area in the pixel became translucent), and the required time lengths were recorded in Table 3 (scattering timer after 1× clearing). Pixels were cleared again by applying four clearing pulses sequentially, and the scattering time was determined again. As shown in Table 4, the SiLC composition containing non-linear side chain liquid crystal polyorganosiloxane (Ex. 3-1 and Ex. 3-4) exhibited greatly improved scattering response and somewhat reduced clearing response, comparing to the same type of SiLC composition containing no non-linear side chain liquid crystal polyorganosiloxane (Comp. Ex. 3-2 and 3-5). Too much non-linear side chain liquid crystal polyorganosiloxane (Comp. Ex. 3-3) in the SiLC composition compromised the low haze in the transmitting state in this particular device. However, without wishing to be bound by theory, it is thought that the composition described in Example 3-3 may work in a device with a smaller gap, such as 8 micrometers.

INDUSTRIAL APPLICABILITY

The non-linear SCLCP described herein differ from previously disclosed SCLCP in that the mesogenic groups are grafted to the siloxane backbone and the siloxane side chains of the polyorganosiloxane. The non-linear SCLCP described herein are useful in SiLC compositions for inclusion in EO devices. The compositions can be prepared reproducibly, are relatively easy to process (e.g., filter to remove particulates which negatively impact EO devices), readily dispersible in low molar mass (LMM) liquid crystal compositions to prepare blends, and exhibit wide temperature liquid crystal phases and relatively high clearing temperatures, which are useful for the design of wide temperature range liquid crystal blends. Adding the non-linear SCLCP described above to a SiLC composition can enable response times with balanced scattering and clearing responses in an EO device having a particular gap, e.g., 6 to 20 micrometers; thereby reducing leading to more homogeneous transitions and improved aesthetic (e.g., reducing or eliminating "blotchy" appearance during transitions, as described above). The non-linear SCLCP described above does not compromise the fine scattering textures observed for SmA liquid crystal compositions containing SCLCPs, which may lead to improved scattering of visible light and hence good hiding power for privacy glazing and smart window applications.

DSC thermograms of the non-linear SCLCP of the examples above show unexpected behavior when compared to a linear SCLCP. The Tg values of the non-linear SCLCP are close to those of the comparative linear SCLCP, however, the width of the liquid crystal phase is expanded and the clearing temperature (liquid crystal to liquid phase transition) is extended by ca 15° C. (onset of transition 92.8° C. to 107.2° C.) when using the non-linear SCLCP. Despite being branched, the non-linear SCLCPs described herein surprisingly exhibit high order liquid crystal phases (e.g., instead of lower order liquid crystal phases such as cholesteric and nematic phases).

FIG. 2 shows an example of a device with four independently addressable segments, showing transmitting and scattering (privacy) states of the device. Both transmitting and scattering states are stable and no power was being applied to the device at the time the device was photographed. The transmitting state has a haze <3% and transmission up to 91%, and the scattering state has a haze close to 100%, as measured for a device with glass substrates and measured using a Gardner Hazegard. The composition of Example 2-4 and the device in Example 3-4 are shown in FIGS. 2 and 3.

TABLE 4

Devices made of Si-LC samples with or without non-linear SCLCP and their EO properties.

| Example | Si-LC | Spacer dia. um | Spacer wt % | Clear state haze <5% | Clearing time, sec | Scattering time after 1x clearing, sec | Scattering time after 4x clearing, sec |
|---|---|---|---|---|---|---|---|
| Ex. 3-1 | Ex. 2-1 | 15 | 2.0 | Y | 6.4 | 7 | 15 |
| Comp. Ex. 3-2 | Ex. 2-2 | 15 | 2.0 | Y | 0.8 | 52 | 79 |
| Comp. Ex. 3-3 | Ex. 2-3 | 15 | 2.0 | N | NA | NA | NA |
| Ex. 3-4 | Ex. 2-4 | 10 | 1.0 | Y | 3.2 | 2 | 8 |
| Comp. Ex. 3-5 | Ex. 2-5 | 10 | 1.0 | Y | 1.6 | 125 | 219 |

FIG. 3 shows a magnified image of the four addressable segment as shown in FIG. 2. The top right and bottom left segments show the transmitting state, and the top left and bottom right show the scattering state. No power was being applied to this bistable device at the time the device was imaged using a microscope. The scattering texture is very fine, note that the circles (for example visible in the transmitting segment at the top right) are spherical spacer beads 10 microns in diameter, which are used to control the thickness of the gap in this Dynamic Scattering Mode device, and this can be used as an internal standard.

Definitions and Usage of Terms

All amounts, ratios, and percentages are by weight unless otherwise indicated. The articles 'a', 'an', and 'the' each refer to one or more, unless otherwise indicated by the context of the specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, or an aralkyl group includes the member alkyl individually; the subgroup alkyl and aryl; and any other individual member and subgroup subsumed therein.

Abbreviations used herein are defined as follows. The abbreviation "cP" means centiPoise, and "cSt" means centiStokes. "DP" means the degree of polymerization. "DSC" means differential scanning calorimetry. "EO" means electro-optic/electro-optical. "FTIR" means Fourier transform infrared spectroscopy. "GC" means gas chromatography. "GPC" means gel permeation chromatography. "Mn" means number average molecular weight. Mn may be measured using GPC. "Mw" means weight average molecular weight. "NMR" means nuclear magnetic resonance. "Pa·s" means Pascal seconds, and "ppm" means parts per million. "SCLCP" means side chain liquid crystal polyorganosiloxane. "SmA" means smectic A.

"Alkyl" means a saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms.

"Alkenyl" means a monovalent hydrocarbon group containing a double bond. Alkenyl groups are exemplified by, but not limited to, ethenyl, propenyl (e.g., iso-propenyl and/or n-propenyl), butenyl (e.g., isobutenyl, n-butenyl, tert-butenyl, and/or sec-butenyl), pentenyl (e.g., isopentenyl, n-pentenyl, and/or tert-pentenyl), hexenyl, heptenyl, octenyl, nonenyl, and decenyl, as well as such branched groups of 6 or more carbon atoms.

"Alkynyl" means a monovalent hydrocarbon group containing a triple bond. Alkynyl groups are exemplified by, but not limited to, ethynyl, propynyl (e.g., iso-propynyl and/or n-propynyl), butynyl (e.g., isobutynyl, n-butynyl, tert-butynyl, and/or sec-butynyl), pentynyl (e.g., isopentynyl, n-pentynyl, and/or tert-pentynyl), hexynyl, heptynyl, octynyl, nonynyl, and decynyl, as well as such branched groups of 6 or more carbon atoms.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms.

"Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl.

"Carbocycle" and "carbocyclic" each mean a hydrocarbon ring. Carbocycles may be monocyclic or alternatively may be fused, bridged, or spiro polycyclic rings. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated or partially unsaturated.

"Cycloalkyl" means saturated carbocycle. Monocyclic cycloalkyl groups are exemplified by cyclobutyl, cyclopentyl, and cyclohexyl.

Collectively, the term "monovalent hydrocarbon group" includes alkyl, alkenyl, aryl, aralkyl, and carbocyclic groups, as defined above.

"Halogenated hydrocarbon" means a hydrocarbon where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4, 3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include allyl chloride.

The term "liquid crystal group" refers to any substituent that has a liquid crystal phase or that will exhibit a liquid crystal phase when grafted to a silicon atom in the non-linear side chain liquid crystal polyorganosiloxane described herein.

The invention claimed is:

1. A non-linear side chain liquid crystal polyorganosiloxane comprising units of formulae:

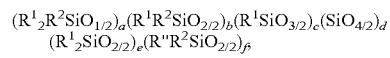

where
each $R^1$ is independently a hydrogen atom, a monovalent hydrocarbon group, a monovalent halogenated hydrocarbon group, or a divalent hydrocarbon group;
each $R^2$ is independently a liquid crystal group;
each R" is a covalent bond to a divalent hydrocarbon group for $R^1$;
subscript a is >0;
subscript b is >0;

subscript c is 0 to 10;
subscript d is 0 to 10, wherein at least one of subscript c and subscript d is >0;
subscript e is ≥0; and
subscript f is ≥0, wherein when at least one instance of $R^1$ is a divalent hydrocarbon group then subscript f is >0, wherein the non-linear side chain liquid crystal polyorganosiloxane is a polycyclic polyorganohydrogensiloxane having linear and branched polyorganosiloxane segments linking silicon atoms in different rings through divalent hydrocarbon groups.

2. The non-linear side chain liquid crystal polyorganosiloxane of claim 1, wherein said non-linear side chain liquid crystal polyorganosiloxane exhibits a smectic liquid crystal phase.

3. The non-linear side chain liquid crystal polyorganosiloxane of claim 1, wherein the non-linear side chain liquid crystal polyorganosiloxane comprises units of formulae:

$(R''R^3SiO_{2/2})_c(R^2R^3SiO_{2/2})_d(HR^3SiO_{2/2})_e$
$(DR^3{}_2SiO_{1/2})_f(R^3{}_2SiO_{2/2})_a(R^3{}_{2-x}R^2{}_xSiO_{1/2})_b$ and
$(R^3{}_{2-x}H_xSiO_{1/2})$, where each subscript x is independently 0 or 1, each D is independently a divalent hydrocarbon group, and each $R^3$ is independently a monovalent hydrocarbon group or a monovalent halogenated hydrocarbon group.

4. The non-linear side chain liquid crystal polyorganosiloxane of claim 1, wherein the non-linear side chain liquid crystal polyorganosiloxane comprises units of formulae:

$(R''R^3SiO_{2/2})(R^2R^3SiO_{2/2})(HR^3SiO_{2/2})(HR^3SiO_{2/2})$
$(DR^3{}_2SiO_{1/2})(R^3{}_2SiO_{2/2})$, where each D is independently a divalent hydrocarbon group and each $R^3$ is independently a monovalent hydrocarbon group or a monovalent halogenated hydrocarbon group.

5. A method for making the non-linear side chain liquid crystal polyorganosiloxane of claim 4, wherein the method comprises:
1) hydrosilylating reactants comprising reactant (A) and reactant (B), where reactant (A) is a cyclic polyorganohydrogensiloxane of formula

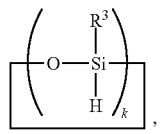

where subscript k is 3 to 12 and each $R^3$ is independently a monovalent hydrocarbon group or a monovalent halogenated hydrocarbon group; and
reactant (B) is an aliphatically unsaturated siloxane oligomer of formula:

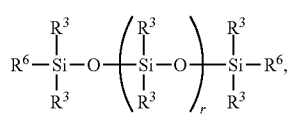

where each $R^6$ is aliphatically unsaturated monovalent hydrocarbon group and subscript r is 0 to 2, thereby preparing i) an SiH rich intermediate; and 2) hydrosilylating reactants comprising
i) the SiH rich intermediate, and
ii) an aliphatically unsaturated liquid crystal group forming compound; thereby forming a reaction product comprising the non-linear side chain liquid crystal polyorganosiloxane.

6. The method of claim 5, further comprising adding reactant (C) in step 1) before and/or during hydrosilylating reactants comprising reactant (A) and reactant (B), where reactant (C) is a SiH functional polyorganosiloxane of formula

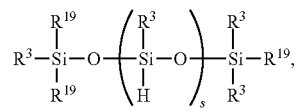

where each $R^{19}$ is independently H or $R^3$ and subscript s is >0.

7. The non-linear side chain liquid crystal polyorganosiloxane of claim 1, wherein the non-linear side chain liquid crystal polyorganosiloxane comprises units of formulae:

$(HR^3SiO_{2/2})(R^2R^3SiO_{2/2})(R^3{}_2SiO_{2/2})(DR^3SiO_{2/2})$
$(HR^3{}_2SiO_{1/2})(R^2R^3{}_2SiO_{1/2})(R''R^3SiO_{2/2})$, where each D is independently a divalent hydrocarbon group and each $R^3$ is independently a monovalent hydrocarbon group or a monovalent halogenated hydrocarbon group.

8. A method for making the non-linear side chain liquid crystal polyorganosiloxane, of claim 7, wherein the method comprises:
1) equilibrating reactants comprising reactant (A), reactant (B), and reactant (C2), where
Reactant (A) is a cyclic polyorganohydrogensiloxane of formula

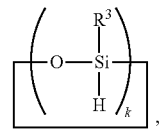

where subscript k is 3 to 12 and each $R^3$ is independently a monovalent hydrocarbon group or a monovalent halogenated hydrocarbon group as described above; and
Reactant (B) is an aliphatically unsaturated siloxane oligomer of formula:

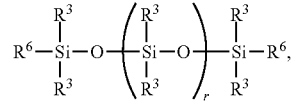

where each $R^6$ is aliphatically unsaturated monovalent hydrocarbon group as defined above and subscript r is 0 to 2, alternatively 0 or 1, and
Reactant (C2) is a hydrogen terminated polydiorganosiloxane oligomer of formula:

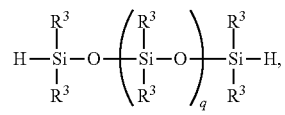

where $R^3$ is as defined above and subscript q is 0 to 2, thereby forming (D) an equilibration product comprising an intermediate;

2) hydrosilylating reactants comprising
 (D) the equilibration product produced in step 1), and
 (E) additional cyclic polyorganohydrogensiloxane of formula

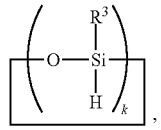

thereby forming an SiH rich intermediate; and 3) hydrosilylating reactants comprising
 i) the SiH rich intermediate, and
 ii) an aliphatically unsaturated liquid crystal group forming compound thereby forming a reaction product comprising the non-linear side chain liquid crystal polyorganosiloxane.

9. A liquid crystal composition useful in electro-optic applications and devices comprises:
 (A) the non-linear side chain liquid crystal polyorganosiloxane of claim 1, and
 (B) a second liquid crystal material that differs from ingredient (A), and optionally further comprising one or more of ingredients (C) to (I), where:
 Ingredient (C) is an ionic dopant,
 Ingredient (D) is a dye,
 Ingredient (E) is a pigment,
 Ingredient (F) is a spacer,
 Ingredient (G) is an additive to tune liquid crystal properties of the composition,
 Ingredient (H) is a monomer, and
 Ingredient (I) is a catalyst for polymerizing the monomer.

10. The liquid crystal composition of claim 9, where the liquid crystal composition exhibits a smectic liquid crystal mesophase.

11. The liquid crystal composition of claim 9, where the liquid crystal composition exhibits a smectic A liquid crystal mesophase.

12. A device comprising:
 (i) a first light transmitting substrate having a first surface,
 (ii) a first light transmitting electrode mounted to the first surface,
 (iii) a second substrate having a second surface,
 (iv) a second electrode mounted to the second surface,
 where the first light transmitting substrate and the second substrate are spaced apart from one another defining a gap between the first surface and the second surface, and
 (vi) the liquid crystal composition of claim 10 interposed between the first light transmitting electrode and the second electrode in the gap; and
 optionally (vii) a spacer between the first surface and the second surface, wherein the spacer controls width of the gap,
 optionally (viii) an edge seal surrounding the gap, thereby containing the liquid crystal composition therein,
 optionally (ix) an interfacial layer on all or a portion of the first surface and/or on all or a portion of the second surface, and
 optionally (x) a barrier layer between the first surface and the first light transmitting electrode, or the between the second surface and the second electrode, or both.

13. A method for fabricating a device comprising:
 (1) forming a thin film of a liquid crystal composition according to claim 9, and
 (2) interposing the thin film between a first light transmitting electrode and a second electrode in an electro-optic device.

\* \* \* \* \*